United States Patent
Chen et al.

(10) Patent No.: US 12,089,170 B2
(45) Date of Patent: Sep. 10, 2024

(54) APPARATUS AND METHOD FOR N1-N2 BITMAP GENERATION FOR CELLULAR COMMUNICATION SYSTEM

(71) Applicant: Samsung Electronics Co., Ltd., Suwon-si (KR)

(72) Inventors: Hao Chen, Plano, TX (US); Shiyang Leng, Allen, TX (US); Ahmed Atef Ibrahim Ibrahim, Plano, TX (US); Namjeong Lee, Suwon-si (KR); Sooyoung Hur, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 265 days.

(21) Appl. No.: 17/693,205

(22) Filed: Mar. 11, 2022

(65) Prior Publication Data
US 2023/0034556 A1    Feb. 2, 2023

Related U.S. Application Data

(60) Provisional application No. 63/227,728, filed on Jul. 30, 2021.

(51) Int. Cl.
*H04B 7/04* (2017.01)
*H04B 7/06* (2006.01)
(Continued)

(52) U.S. Cl.
CPC .......... *H04W 52/42* (2013.01); *H04B 7/0634* (2013.01)

(58) Field of Classification Search
CPC .......... H04B 7/04; H04B 7/06; H04B 7/0408; H04B 7/0426; H04B 7/0456;
(Continued)

(56) References Cited

U.S. PATENT DOCUMENTS 9,277,547 B2    3/2016  Yang et al.
10,855,344 B1 *  12/2020  Chukka ................. H04B 7/043
(Continued)

FOREIGN PATENT DOCUMENTS

CN    113162662 A    7/2021
WO    2020051508 A1   3/2020

OTHER PUBLICATIONS

International Search Report and Written Opinion issued Jun. 30, 2022 regarding International Application No. PCT/KR2022/004872, 7 pages.
(Continued)

*Primary Examiner* — Said M Elnoubi

(57) ABSTRACT

Methods and apparatuses in a wireless communication system. A base station (BS) includes a transceiver and a processor. The processor regulates a transmit power in a direction of an earth station or a predefined receiver by: calculating a power flux density for the BS to the earth station or the predefined receiver; calculating an equivalent antenna gain for other base stations; calculating a directional power back-off level for the other base stations with respect to the earth station or the predefined receiver; generating a restricted precoding matrix indicator based on the calculated directional power back-off level; generating an N1-N2 bitmap for the BS; and applying the N1-N2 bitmap for signal transmission to at least one UE. The N1-N2 bitmap is generated based on: physical parameters of the earth station of the predefined receiver; physical parameters of the BS; an operator input metric; or restricted precoding matrix indicator.

20 Claims, 11 Drawing Sheets

(51) Int. Cl.
*H04W 52/18* (2009.01)
*H04W 52/42* (2009.01)

(58) Field of Classification Search
CPC .. H04B 7/0634; H04B 7/0639; H04B 17/345; H04W 52/18; H04W 52/42; H04W 52/243; H04W 52/38; H04W 52/367
See application file for complete search history.

(56) References Cited

U.S. PATENT DOCUMENTS

| | | | |
|---|---|---|---|
| 10,873,371 | B1 | 12/2020 | Mandavilly et al. |
| 10,924,163 | B2* | 2/2021 | Dayvdov ............. H04B 7/0658 |
| 2012/0099666 | A1 | 4/2012 | Baldemair et al. |
| 2016/0227577 | A1 | 8/2016 | Ashikhmin et al. |
| 2016/0337047 | A1 | 11/2016 | Khoshnevisan et al. |
| 2017/0195163 | A1 | 7/2017 | Chae et al. |
| 2018/0026687 | A1 | 1/2018 | Rahman et al. |
| 2020/0364187 | A1* | 11/2020 | Tran ....................... G06N 20/00 |
| 2020/0366344 | A1 | 11/2020 | Davydov et al. |
| 2021/0152303 | A1 | 5/2021 | Hao et al. |
| 2021/0153143 | A1 | 5/2021 | Sridharan et al. |
| 2021/0167837 | A1 | 6/2021 | Grossmann et al. |
| 2021/0389474 | A1* | 12/2021 | Hamzeh ................ H04W 16/14 |

OTHER PUBLICATIONS

Sateliot et al., "Discussion on NB-IoT NTN scenarios with small satellites / CubeSats", 3GPP TGS RAN WG1 Meeting #104-e, R1-2100521, Jan. 2021, 13 pages.
"3rd Generation Partnership Project; Technical Specification Group Radio Access Network; NR; Physical layer procedures for data, (Release 16)", 3GPP TS 38.214 V16.8.0, Dec. 2021, 172 pages.
Extended European Search Report issued Jun. 4, 2024 regarding Application No. 22849662.6, 7 pages.

* cited by examiner

APPARATUS AND METHOD FOR N1-N2 BITMAP GENERATION FOR CELLULAR COMMUNICATION SYSTEM

CROSS-REFERENCE TO RELATED APPLICATIONS AND CLAIM OF PRIORITY

The present application claims priority to U.S. Provisional Patent Application No. 63/227,728, filed on Jul. 30, 2021. The content of the above-identified patent document is incorporated herein by reference.

TECHNICAL FIELD

The present disclosure relates generally to a diverse networks and, more specifically, the present disclosure relates to a N1-N2 bitmap generation for communication systems.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency, coverage, and quality of service are of paramount importance.

SUMMARY

The present disclosure generally relates to diverse networks and, more specifically, the present disclosure relates to beam nulling for non-terrestrial systems.

In a first embodiment, a base station (BS) in a wireless communication system is provided. The BS includes a transceiver and a processor. The processor is configured to regulate a transmit power in a direction of an earth station or a predefined receiver by: calculating a power flux density for the BS to at least one of the earth station or the predefined receiver; calculating an equivalent antenna gain for each of a number of base stations; calculating a directional power back-off level for each of the number of base stations with respect to the earth station or the predefined receiver; generating a restricted precoding matrix indicator (PMI) based on the calculated directional power back-off level; generating an N1-N2 bitmap for the BS; and applying the N1-N2 bitmap for signal transmission to the at least one UE. The N1-N2 bitmap is generated based on one or more of: physical parameters of the earth station of the predefined receiver; physical parameters of the BS; an operator input metric; and restricted precoding matrix indicator.

In a second embodiment, a method of a base station (BS) for a wireless communication system is provided. The method includes regulate a transmit power in a direction of an earth station or a predefined receiver by: calculating a power flux density for the BS to at least one of the earth station or the predefined receiver; calculating an equivalent antenna gain for each of a number of base stations; calculating a directional power back-off level for each of the number of base stations with respect to the earth station or the predefined receiver; generating a restricted precoding matrix indicator (PMI) based on the calculated directional power back-off level; generating an N1-N2 bitmap for the BS; and applying the N1-N2 bitmap for signal transmission to the at least one UE. The N1-N2 bitmap is generated based on one or more of: physical parameters of the earth station of the predefined receiver; physical parameters of the BS; an operator input metric; and restricted precoding matrix indicator.

In a third embodiment, a non-transitory computer readable medium is provided. The non-transitory computer readable medium includes instructions that, when executed by at least one processor, are configured to cause the at least one processor to regulate a transmit power in a direction of an earth station or a predefined receiver by: calculating a power flux density for the BS to at least one of the earth station or the predefined receiver; calculating an equivalent antenna gain for each of a number of base stations; calculating a directional power back-off level for each of the number of base stations with respect to the earth station or the predefined receiver; generating a restricted precoding matrix indicator (PMI) based on the calculated directional power back-off level; generating an N1-N2 bitmap for the BS; and applying the N1-N2 bitmap for signal transmission to the at least one UE. The N1-N2 bitmap is generated based on one or more of: physical parameters of the earth station of the predefined receiver; physical parameters of the BS; an operator input metric; and restricted precoding matrix indicator.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, a reference is now made to the following description taken in conjunction with the accompanying drawings, in which like reference numerals represent like parts.

DETAILED DESCRIPTION

Figure 1:
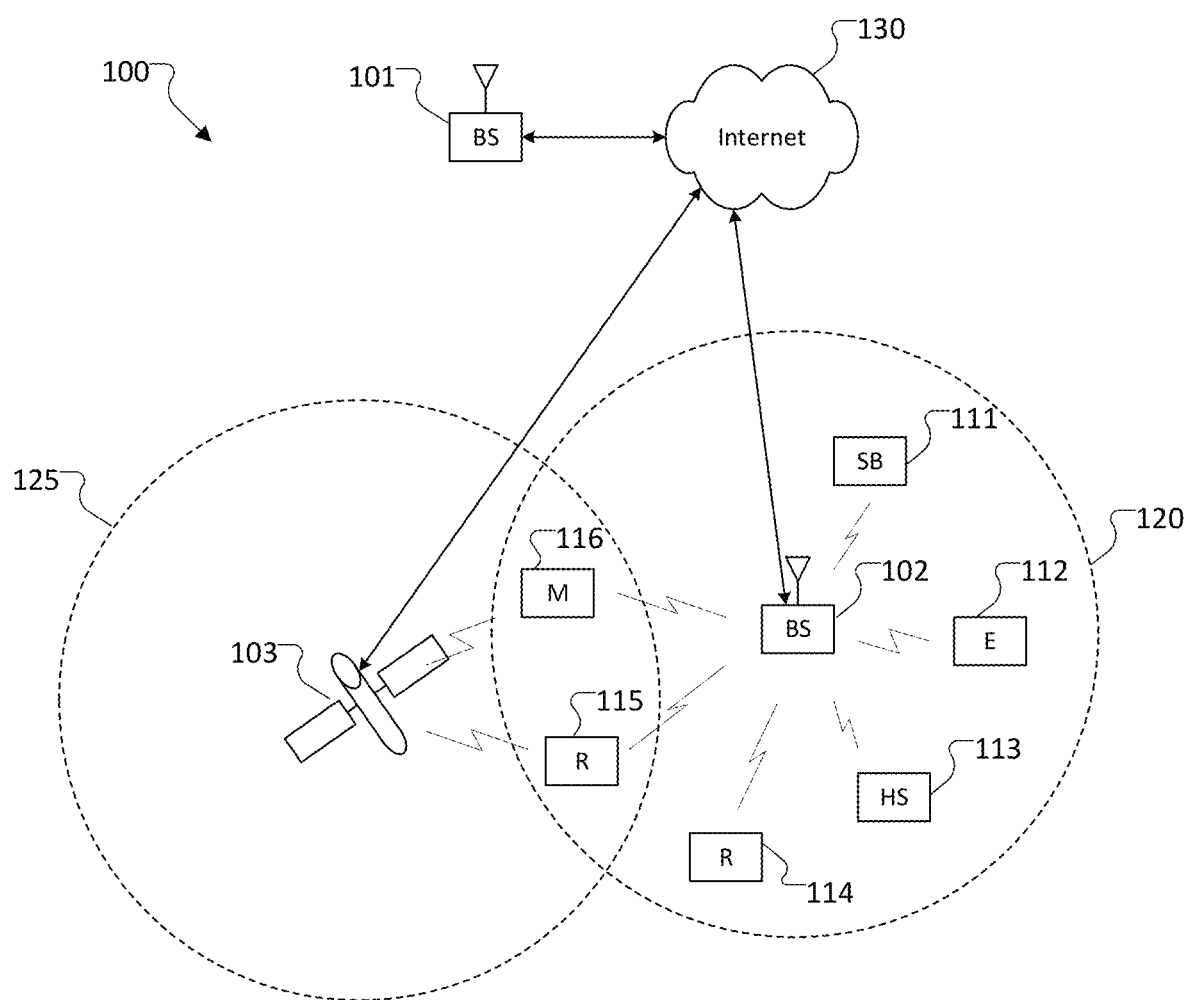
FIG. 1 illustrates an example wireless network according to embodiments of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems and to enable various vertical applications, efforts have been made to develop and deploy an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. Aspects of the present disclosure may also be applied to deployment of 5G communication system, 6G or even later release which may use terahertz (THz) bands. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

In many cases, cellular networks are deployment in locations where satellite earth-stations (ES) exist. Cellular operation bands can be adjacent to ES operation band. There are harsh constraints on the amount of interference that ES can tolerate in their band of operation. Even though cellular networks are operating in a different adjacent band, out of band (OOB) emission still affects ES. Hence, transmission back-off is required to avoid OOB interference.

Power reduction is one way to reduce interference to ESs, which, however, will cause a smaller coverage and performance degradation. In order to reduce interference to ESs while maintaining coverage and mitigating performance degradation, common beam and SRS-based data beam can be designed so that the radiation power is reduced directionally towards the ES, referring to as directional nulling. Methods of bitmapping for beam restriction need to be designed.

Embodiments of the present disclosure provide methods for developing the bitmap generation for each MMU to meet the regulation and to improve the performance of MMU. Certain embodiments provide multiple methods to generate the bitmap. Embodiments of the present disclosure can be applied but not limited to interference reduction to satellite earth stations and other MMUs, which should be considered in an inclusive manner without exclusion of other use cases.

Figure 2:
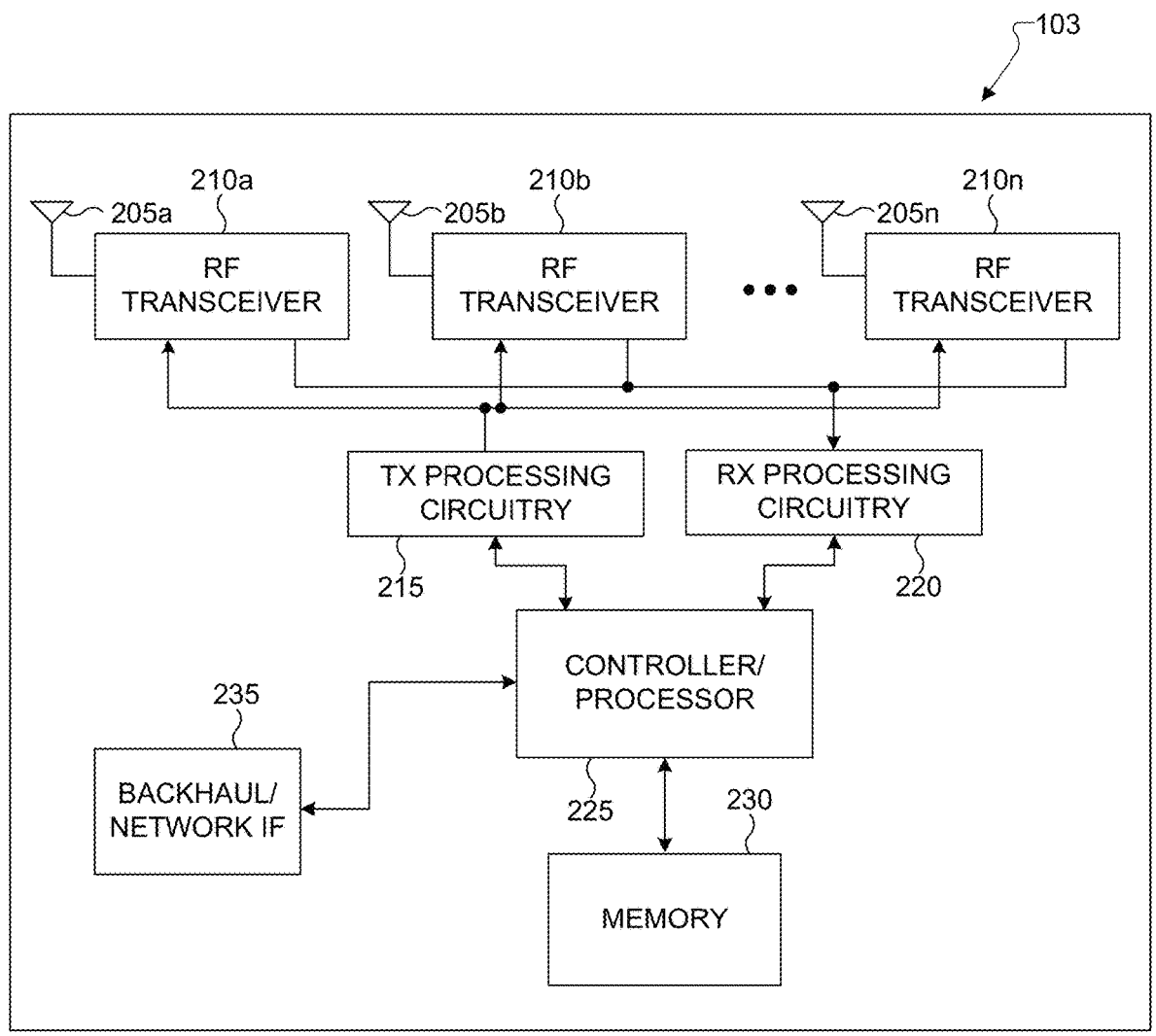
FIG. 2 illustrates an example gNB according to embodiments of the present disclosure.
Figure 3:
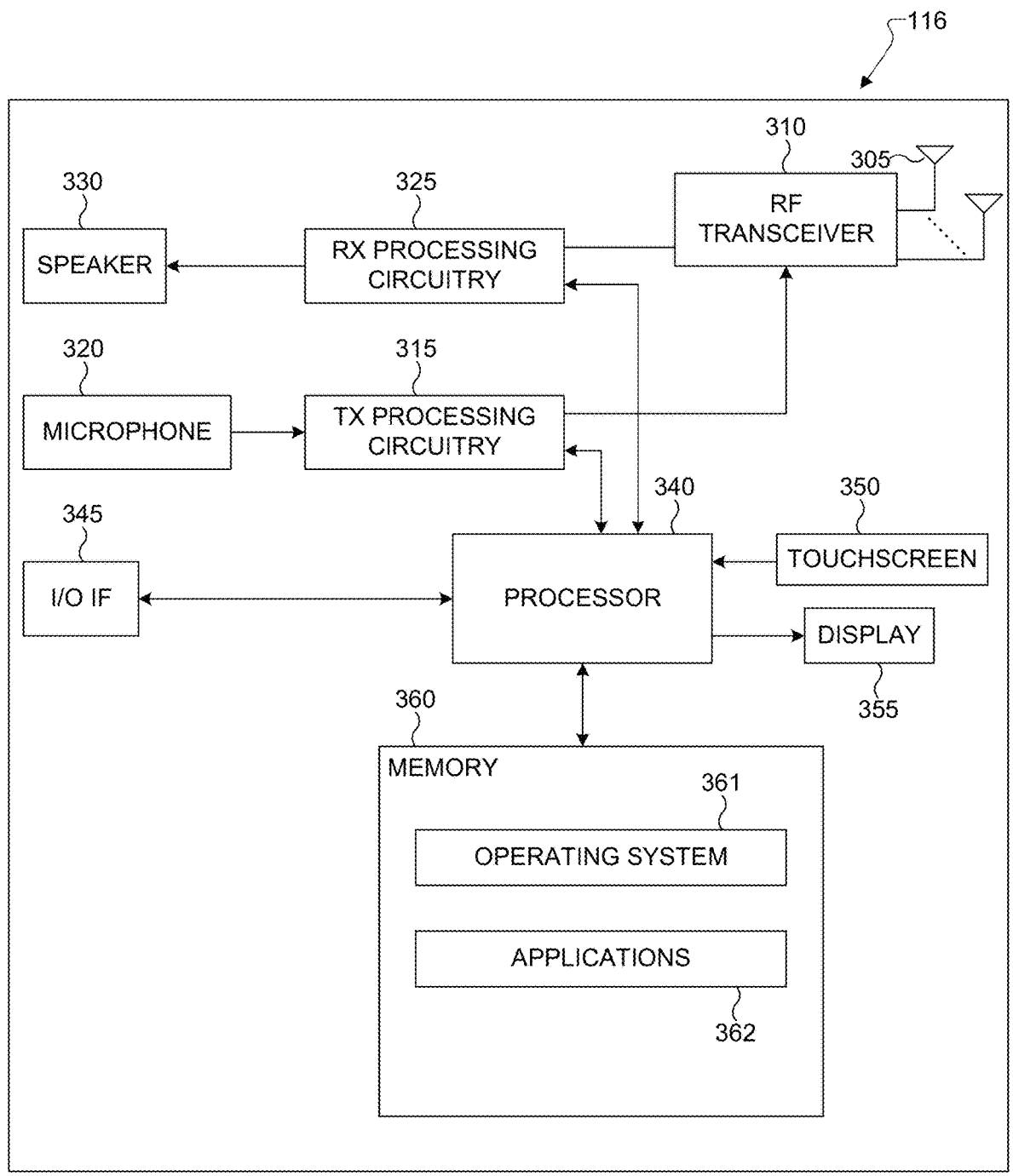
FIG. 3 illustrates an example UE according to embodiments of the present disclosure.

FIGS. 1-3 below describe various embodiments implemented in wireless communications systems and with the use of orthogonal frequency division multiplexing (OFDM)

or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network. In certain embodiments, the gNB 103 is a non-terrestrial BS. For example, gNB 103 can be a satellite positioned in a geosynchronous equatorial orbit (geostationary orbit, GEO) or in a low earth orbit (LEO). Additionally, gNB 103 can be a satellite orbiting station coupled to a satellite earth station.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The coverage area 125 provided by gNB 103 can be part of a non-terrestrial network (NTN). The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for flexible quality of service control for diverse networks. In certain embodiments, and one or more of the gNBs 101-103 includes circuitry, programing, or a combination thereof for flexible quality of service control for diverse networks.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 103 according to embodiments of the present disclosure. The embodiment of the gNB 103 illustrated in FIG. 2 is for illustration only, and the gNBs 101 and 102 of FIG. 1 could have the same or similar configuration. However, gNBs come in a wide variety of configurations, and FIG. 2 does not limit the scope of this disclosure to any particular implementation of a gNB.

As shown in FIG. 2, the gNB 103 includes multiple antennas 205a-205n, multiple RF transceivers 210a-210n, transmit (TX) processing circuitry 215, and receive (RX) processing circuitry 220. The gNB 103 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 103. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 103 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 103 to communicate with other devices or systems over a backhaul connection or over a network. The interface 235 could support communications over any suitable wireless connection(s). When disposed as part of a terrestrial network, such as gNB 101 and gNB 102, The interface 235 could support communications over any suitable wired or wireless connection(s). For example, when the gNB 103 is implemented as part of a cellular communication system (such as one supporting 5G/NR, LTE, or LTE-A), the interface 235 could allow the gNB 103 to communicate with other gNBs over a wireless backhaul connection while gNB 101 and gNB 102 can communicate with other gNBs over a wired or wireless backhaul connection. When the one or the gNBs 101-103 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a flash memory or other ROM.

Although FIG. 2 illustrates one example of gNB 103, various changes may be made to FIG. 2. For example, the gNB 103, and respectively gNB 101 and 102 as part of terrestrial networks, could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and RX processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figure 4A:
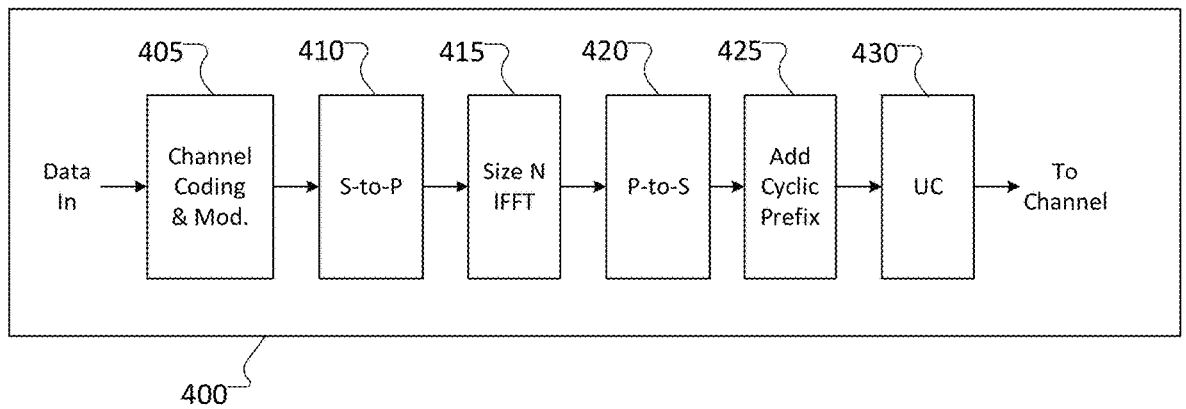
FIGS. 4A and 4B illustrate example wireless transmit and receive paths according to this disclosure.
Figure 4B:
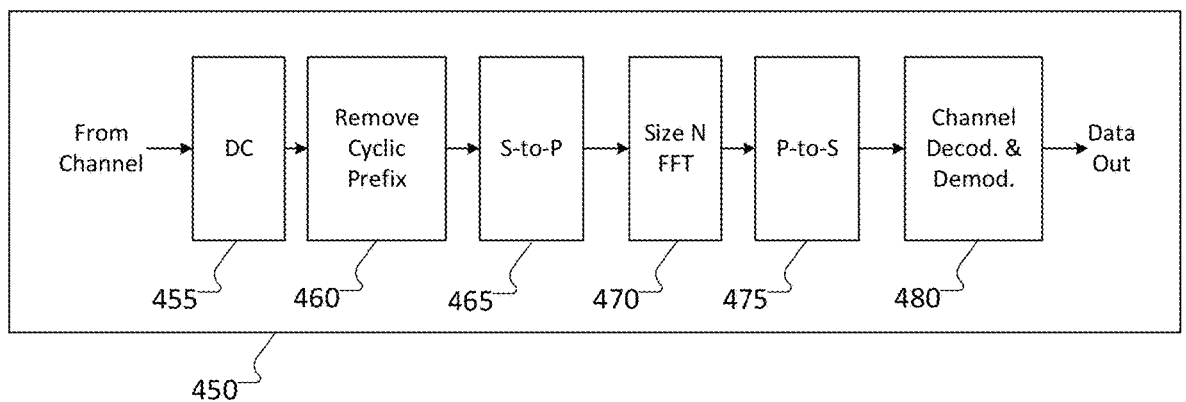

FIG. 4A and FIG. 4B illustrate example wireless transmit and receive paths according to this disclosure. In the following description, a transmit path 400 may be described as being implemented in a gNB (such as the gNB 102), while a receive path 450 may be described as being implemented in a UE (such as a UE 116). However, it may be understood that the receive path 450 can be implemented in a gNB and that the transmit path 400 can be implemented in a UE. In some embodiments, the receive path 450 is configured to support adapting a channel sensing threshold as described in embodiments of the present disclosure.

The transmit path 400 as illustrated in FIG. 4A includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 450 as illustrated in FIG. 4B includes a down-converter (DC) 455, a remove cyclic prefix block 460, a serial-to-parallel (S-to-P) block 465, a size N fast Fourier transform (FFT) block 470, a parallel-to-serial (P-to-S) block 475, and a channel decoding and demodulation block 485.

As illustrated in FIG. 4A, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 4B, the down-converter 455 down-converts the received signal to a baseband frequency, and the remove cyclic prefix block 460 removes the cyclic prefix to generate a serial time-domain baseband signal. The serial-to-parallel block 465 converts the time-domain baseband signal to parallel time domain signals. The size N FFT block 470 performs an FFT algorithm to generate N parallel frequency-domain signals. The parallel-to-serial block 475 converts the parallel frequency-domain signals to a sequence of modulated data symbols. The channel decoding and demodulation block 485 demodulates and decodes the modulated symbols to recover the original input data stream.

Each of the gNBs 101-103 may implement a transmit path 400 as illustrated in FIG. 4A that is analogous to transmitting in the downlink to UEs 111-116 and may implement a receive path 450 as illustrated in FIG. 4B that is analogous to receiving in the uplink from UEs 111-116. Similarly, each of UEs 111-116 may implement the transmit path 400 for transmitting in the uplink to the gNBs 101-103 and may implement the receive path 450 for receiving in the downlink from the gNBs 101-103.

Each of the components in FIG. 4A and FIG. 4B can be implemented using only hardware or using a combination of hardware and software/firmware. As a particular example, at least some of the components in FIG. 4A and FIG. 4B may be implemented in software, while other components may be implemented by configurable hardware or a mixture of software and configurable hardware. For instance, the FFT block 470 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4A and FIG. 4B illustrate examples of wireless transmit and receive paths, various changes may be made to FIG. 4A and FIG. 4B. For example, various components in FIG. 4A and FIG. 4B can be combined, further subdivided, or omitted and additional components can be added according to particular needs. Also, FIG. 4A and FIG. 4B are meant to illustrate examples of the types of transmit and receive paths that can be used in a wireless network. Any other suitable architectures can be used to support wireless communications in a wireless network.

Figure 5:
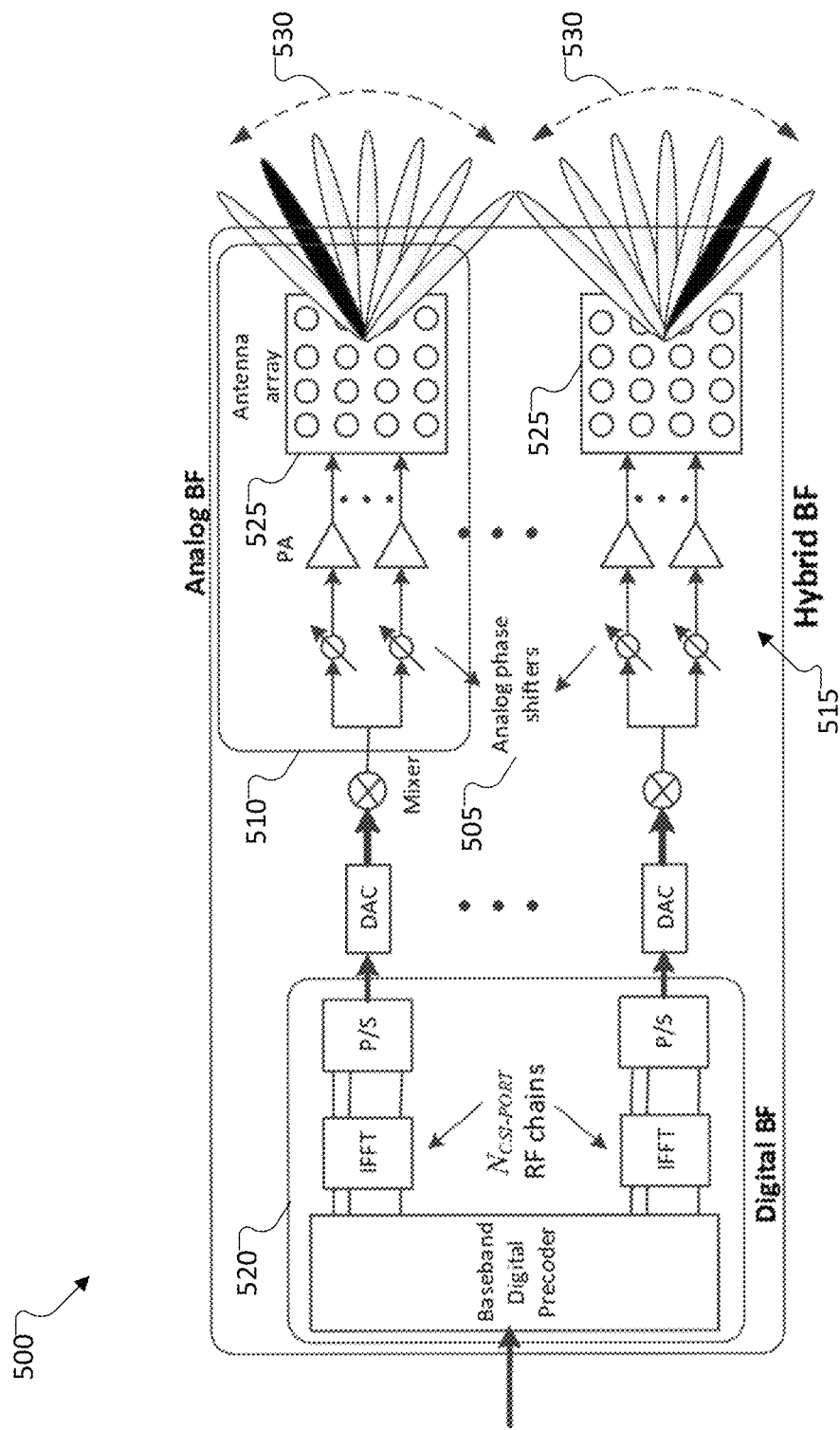
FIG. 5 illustrates an example antenna according to embodiments of the present disclosure.

FIG. 5 illustrates an example antenna blocks 500 according to embodiments of the present disclosure. The embodiment of the antenna 500 illustrated in FIG. 5 is for illustration only. FIG. 5 does not limit the scope of this disclosure to any particular implementation of the antenna 500. In certain embodiments, one or more of gNB 102 or UE 116 include the antenna 500. For example, one or more of antenna 205 and its associated systems or antenna 305 and its associated systems can be configured the same as antenna 500.

Rel. 14 LTE and Rel. 15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies).

In the example shown in FIG. 5, the antenna 500 includes analog phase shifters 505, an analog beamformer (BF) 510, a hybrid BF 515, a digital BF 520, and one or more antenna arrays 525. In this case, one CSI-RS port is mapped onto a large number of antenna elements in antenna arrays 525, which can be controlled by the bank of analog phase shifters 505. One CSI-RS port can then correspond to one sub-array which produces a narrow analog beam through analog beamforming by analogy BF 510. The analog beam can be configured to sweep 530 across a wider range of angles by varying the phase shifter bank 505 across symbols or subframes. The number of sub-arrays (equal to the number of RF chains) is the same as the number of CSI-RS ports $N_{CSI-PORT}$. A digital BF 515 performs a linear combination across $N_{CSI-PORT}$ analog beams to further increase precoding gain. While analog beams are wideband (hence not frequency-selective), digital precoding can be varied across frequency sub-bands or resource blocks.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

Additionally, the antenna 500 system is also applicable to higher frequency bands such as >52.6 GHz (also termed the FR4). In this case, the system can employ only analog beams. Due to the O2 absorption loss around 60 GHz frequency (~10 decibels (dB) additional loss @100 m distance), larger number of and sharper analog beams (hence larger number of radiators in the array) will be needed to compensate for the additional path loss.

Figure 6A:
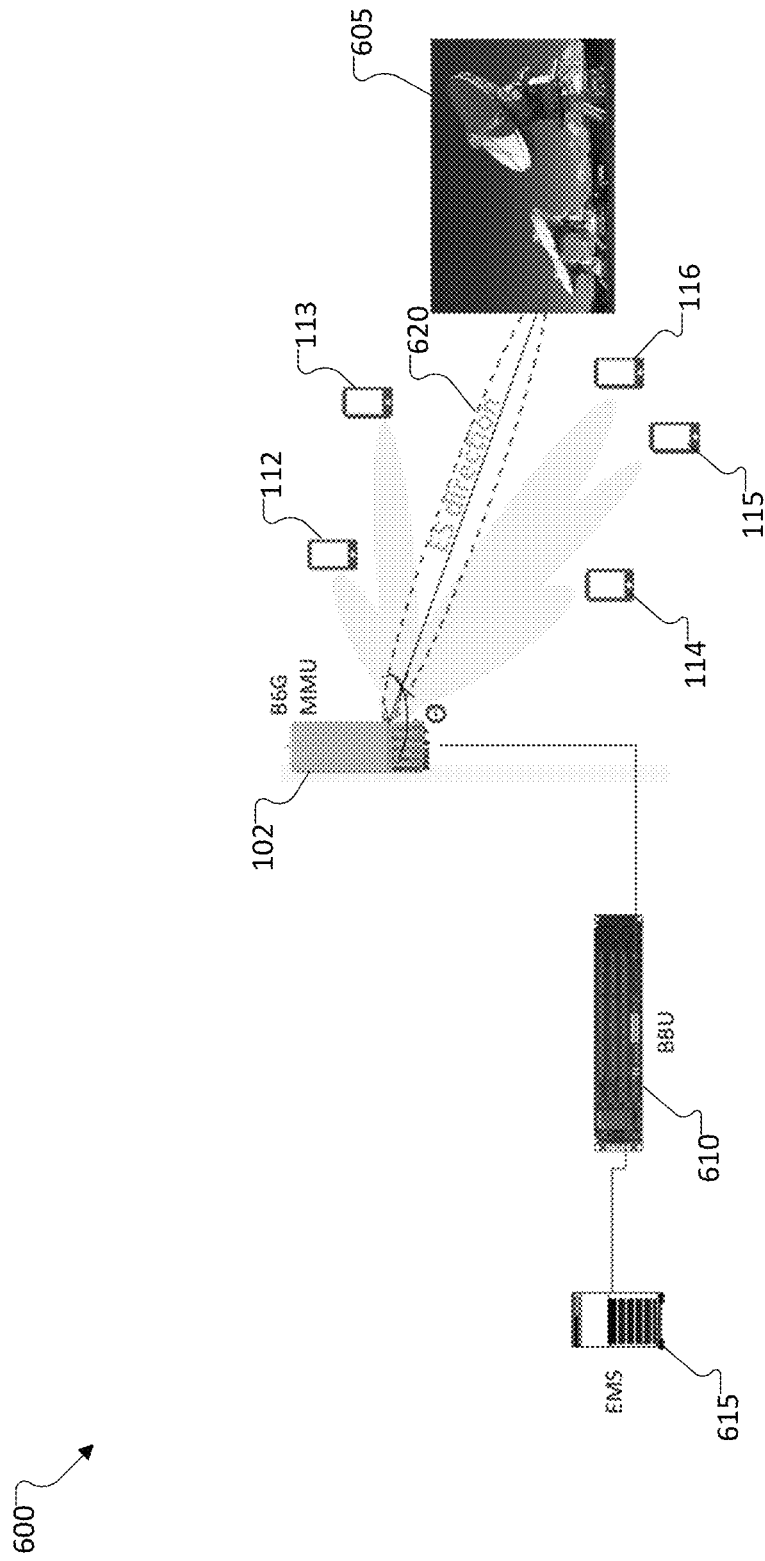
FIGS. 6A and 6B illustrate an example interference in wireless communications network having terrestrial and non-terrestrial stations according to embodiments of the present disclosure.
Figure 6B:
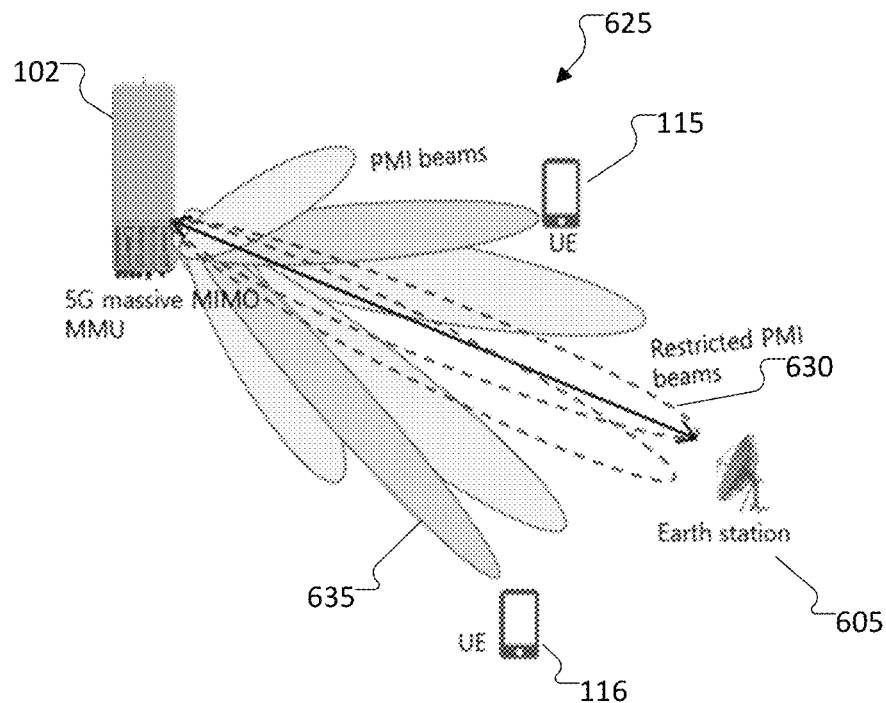
Figure 6C:
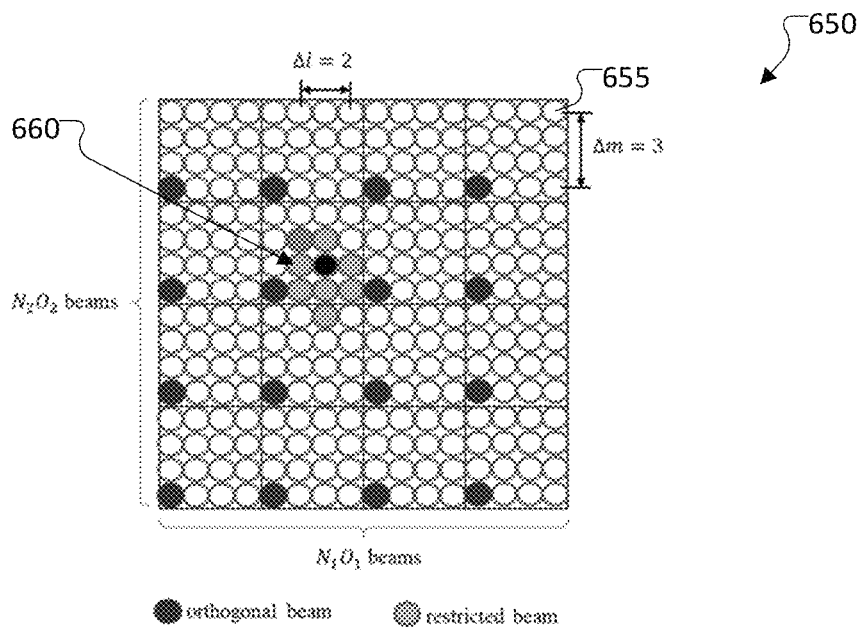
FIG. 6C illustrates an example beam forming bitmap according to embodiments of the present disclosure.

FIGS. 6A and 6B illustrate an example interference in wireless communications network having terrestrial and non-terrestrial stations according to embodiments of the present disclosure. FIG. 6C illustrates an example beam forming bitmap according to embodiments of the present disclosure. The embodiments shown in FIGS. 6A-6C are for illustration only. Other embodiments could be used without departing from the scope of the present disclosure.

In many cases, cellular networks 600 are deployed in locations where satellite earth-stations (ES) 605 exist. In the present disclosure, one or multiple approaches described below can be implemented to realize the concept for diverse networks including a non-terrestrial network (NTN) and a high-capacity network. In certain embodiments, for the NTN architecture, gNB 103 comprises a gNB-distributed unit (gNB-DU) disposed on a satellite and a gNB-centralized unit (gNB-CU) disposed on the ES 605. In such case, the gNB-CU on the ES 605 can control the amount of data being sent to the gNB-DU on the satellite based on gNB-DU memory capabilities. In an implementation-specific manner, the gNB-CU on the ES 605 can take care most of the storage (e.g., at the packet data convergence protocol (PDCP) layer) to alleviate any significant memory requirements on the gNB-DU.

Cellular operation bands, such as via gNB 102, can be adjacent to ES 605 operation band. For example, 5G emission, in coverage area, from gNB 102 can interfere with communications from the on the ES 605. Additionally, there are harsh constraints on the amount of interference that ES 605 can tolerate in their band of operation. That is, the 5G massive MIMO system on C-band can cause some interference to the ES 605 for satellite communication. The Federal Communication Commission (FCC) has implemented regulations on the C-Band emissions. To comply with the FCC regulations, the 5G massive MIMO system needs to be designed to control the interference to the ES 605, namely, for the satellite communication in C-band.

In the example shown in FIG. 6A, a cellular network 600 includes a base station, such as gNB 102 in the vicinity of an ES 605. The gNB 102 can be a massive-MIMO unit (MMUs) that is coupled to base band unit (BBU) 610 and element management system (EMS) 615. The ES 605 can be the satellite earth station for gNB 103. Spectrum allocation on C-band (3.6~4.2 GHz) is critical for 5G deployment due to the merit of coverage and capacity of C-band signals. A part of C-band is occupied by satellite communication in some countries. The deployment of cellular network 600 as a 5G massive MIMO systems on C-band will cause significant interference in the direction 620 of primarily fixed receive-only earth stations 605 for satellite communication. Thus, interference control to earth stations in C-band needs to be addressed for the coexistence of 5G massive MIMO systems and satellite earth stations.

The spectrum regulation policy on C-band is different from country to country. For example, in the United States of America (USA), in order to protect incumbent earth stations, the FCC has defined that the power flux density (PFD) of out-of-band emissions from fixed and mobile operations must not exceed −124 dBW/m2/MHz for 3820-4200 MHz band measured at earth station 605 antennas. Therefore, the cellular network 600 are required to control the out-of-band emission interference to earth stations 605 when working in C-band. In Japan, the C-band has been fully shared between earth stations and cellular systems. Therefore, cellular systems are required to carefully control the in-band interference to earth stations to avoid FSS interruption. Meeting the spectrum regulation is currently one of the main pain-points for operators when deploying the 5G systems.

Power reduction is one way to reduce interference to the ES 605, which, however, will cause a smaller coverage and performance degradation. Even though cellular networks are operating in a different adjacent band, out of band (OOB) emission still affects ES 605, hence, transmission power back-off may be required in some cases to avoid OOB interference. In certain scenarios, to mitigate OOB interference, gNB 102 may perform power reduction and transmit to a reduced coverage area. In response, the ES 605 continues to measure the interference while gNB 102 continues to reduce the power so that the interference coming from gNB 102 would comply with the regulations. In certain situations, if gNB 102 only reduces the power, for example, if gNB 102 transmits 40 decibels (dB), the received power is 25 dB. A problem with this power back off is that it deteriorates the through-put or performance. That is, reducing the power to reduce the interference may affect the performance of the system as well.

For example, a Japanese operators may be required to reduce cellular transmit power by 20 dB in some areas to meet the C-band spectrum regulation. This simple power-reduction approach makes 5G cellular system suffer from not only huge coverage reduction but also performance degradation. The data beam can be formed based on the precoding matrix indicator (PMI) feedback 625 in a CSI report sent by a UE 116. To reduce interference to ES 605, the PMIs 630 forming beams pointing to the ES 605 can be restricted so that the data beam is nulled in the ES direction 620. One CSI report is configured with only one PMI bitmap, and a UE 116 reports selected PMIs among all allowed PMIs indicated in the bitmap for different ranks. For example, a full PMI bitmap can be configured. For a certain rank, if the reported PMIs belong to the set of restricted PMIs 630, alternative PMIs have to be selected at the BS to generate the data beam.

In the example shown in FIG. 6C, a bitmap 650 is depicted. In PMI-based MIMO transmission, data beam can be generated based on UE CSI measurement on downlink CSI-RS, which consists of CQI, PMI, and RI feedback through uplink. The interference from the MMUs to the ES 605 can be reduced directionally by restricting PMIs 630 forming data beams pointing to the ES 605. UE 116 can only select and report unrestricted PMIs 635 that are informed by gNB 102 via a PMI bitmap parameter with 1 indicating allowed PMI beam and 0 indicating restricted PMI 630 beam. For different ranks, the restricted PMIs 630 can be different. Due to limited capacity of control channel, a shared PMI bitmap is used for different ranks in one CSI report configuration. Certain embodiments of the present disclosure provide a system and method to generate the bitmap to meet the regulation restriction and to improve the performance of MMU.

In the bitmap 650, each circle corresponds to a beam and represents a transmission direction between gNB 102 and ES 605. The non-shaded circles correspond to certain beams 655 that do not interfere with ES 605. Additionally, certain beams 660, shown as shaded in the example depicted in FIG. 6C, that transmitted from gNB 102 will cause a large interference for the ES 605. Therefore, one or more beams, such as a set of beams, are designed such that a transmission by the gNB 102 will not interfere with the ES 605 and further will enhance the cellular communication with the gNB 102. The bitmap 650 is designed such that a minimum set of beams 660 are restricted from use. That is, the gNB 102 can use the beams corresponding to the non-shaded circles 655.

Figure 7:
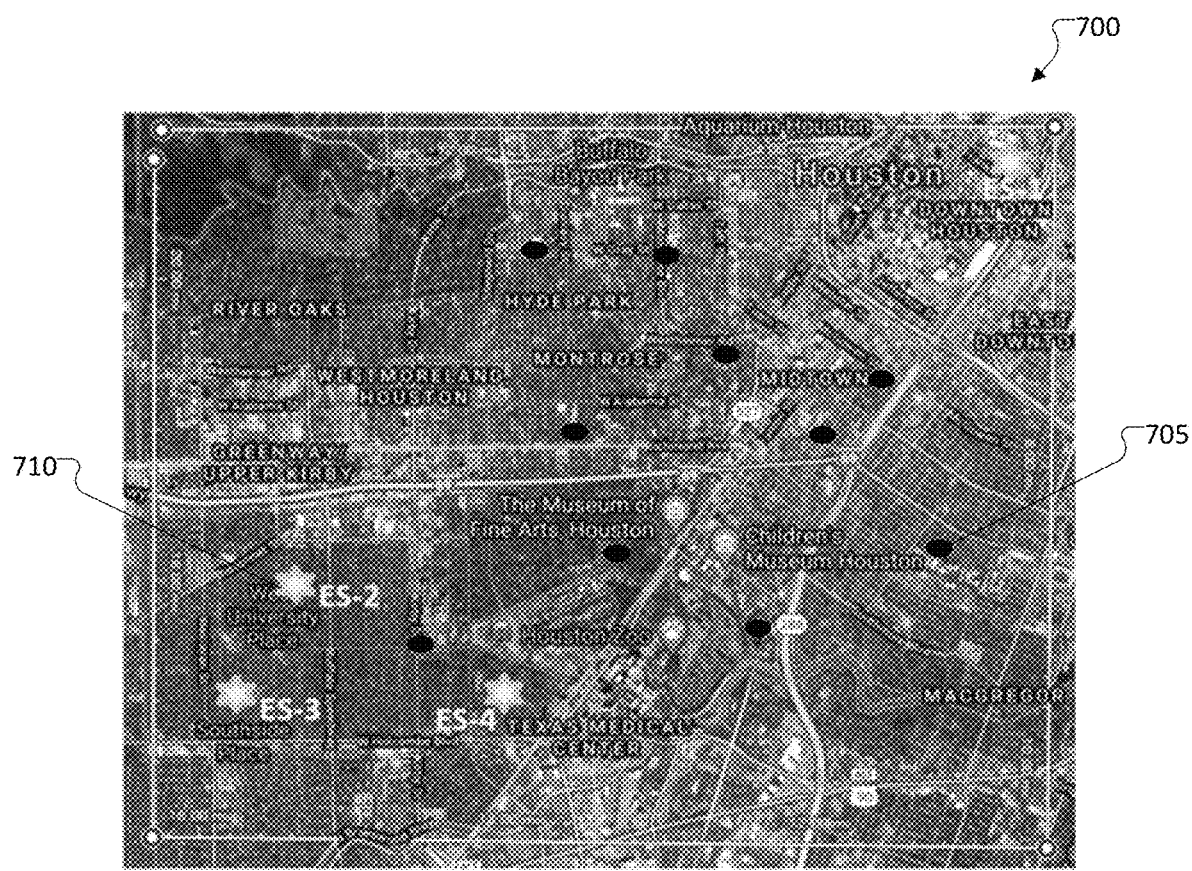
FIG. 7 illustrates an example wireless network in an urban environment according to embodiments of the present disclosure.

FIG. 7 illustrates an example wireless network in an urban environment according to embodiments of the present disclosure. The embodiment of the urban environment 700 shown in FIG. 7 is for illustration only. Other embodiments could be used without departing from the scope of the present disclosure.

In the example shown in FIG. 7, the urban environment 700 includes a number of MMUs 705, which can be configured the same as the gNB 102, and a number of earth stations 710, which can be configured the same as the ES 605. The locations for each of the earth stations 710 is known as well as for each MMU 705. For each MMU 705, a bitmap is generated to control interference from each respective MMU 705 to each respective earth station 710. The bitmaps are designed to restrict as few as possible beams for transmission from each MMU 705.

Figure 8:
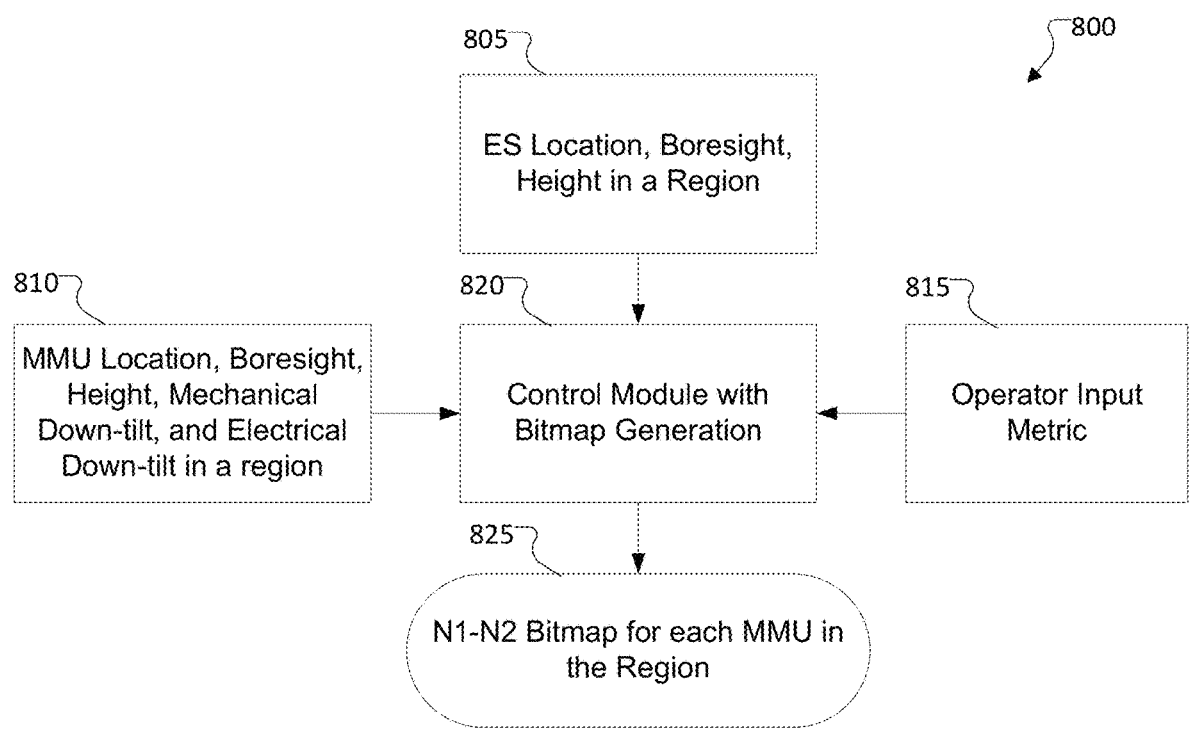
FIGS. 8, 9A, and 9B illustrate processes for bitmap generation according to embodiments of the present disclosure.

FIG. 8 illustrates a process for global optimization according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 800 depicted in the examples depicted is implemented by a processor and transmitter chain in, for example, a base station.

In certain embodiments, in operation 805 a control module collects all the earth stations' location information, height information and boresight information from a region. In operation 810, the control module collects all the MMU's location information, height information, mechanical down-tilt information and electrical down-tilt information. In operation 815, the control module receives one or more operator input metrics including, but not limit to, coverage and throughput requirement. The control module generates a bitmap in operation 820. In operation 825, the control module outputs, for each MMU, its PMI restriction bitmap N1-N2. These N1-N2 will be configured to each UE in the network through RRC signaling. For one example, the information of ES is optional. For another example, the information of ES could be replaced by a specific selected region where the operators do not want to be interfered.

In certain embodiments, each MMU automatically generates its N1-N2 bitmap based on the MMU's location, height, mechanical down-tilt, electrical down-tilt, and earth stations' location, height and boresight angles. For example, s, i, j can be denoted as the index for PMI, MMU and ES 605. Further, S, I, J can be denoted as the total number of PMIs, MMUs 705, and ESs 10 in the region, respectively. Additionally, P(s, i, j) can be denoted as the power flux density PFD from MMU i, to ES j with PMI index s. That is, after removing any PMI that can potentially cause interference, for any earth station, we need to sum of the power over all the cellular base stations so that the total power is less than the threshold defined by the FCC. In certain embodiments, for one ES j, in order to meet the regulation, the total set of remaining PMI can be expressed as:

$$\hat{S}(i)=\{s|\Sigma_i P(s,i,j) \leq Th_j\} \quad (1A)$$

$$\Sigma_i P(s,i,j) \leq Th_j, \forall s \in \hat{S}(i), \forall j \in J \quad (1B)$$

In Equations 1A and 1B, $Th_j$ is the PFD threshold for ES j. For each earth station, the beam is reduced as much as possible. In certain embodiments, the system design target is to maximize the overall remaining PMIs in the system so that the system throughput can be maximized, as:

$$\max_{s} \Sigma_i |\hat{S}(i)| \quad (2)$$

In Equation 2, $|\hat{S}(i)|$ represent the number of PMIs remaining in MMU i. The solution of above optimization problem will be used to get the remaining PMIs for each MMU.

In certain embodiments, the PFD at the ES 605 side can be expressed as, where PDL represent the power density loss and G(s, φ, θ) represent the antenna gain of PMIs for the ES 605 at direction (φ, θ), $P_{tx}$ is the transmit power.

$$P(s, i, j) = P_{tx}(i) - PDL(i, j) + G(s, \varphi, \theta), \text{ in dB} \quad (3)$$

$$P(s, i, j) = \frac{P_{tx}(i)}{PDL(i, j)} * G(s, \varphi, \theta), \text{ in linear} \quad (4)$$

One method to calculate the PDL in linear domain is $$PDL = \frac{1}{4\pi r^2},$$

where r is the distance from MMU to ES.

Figure 9B:
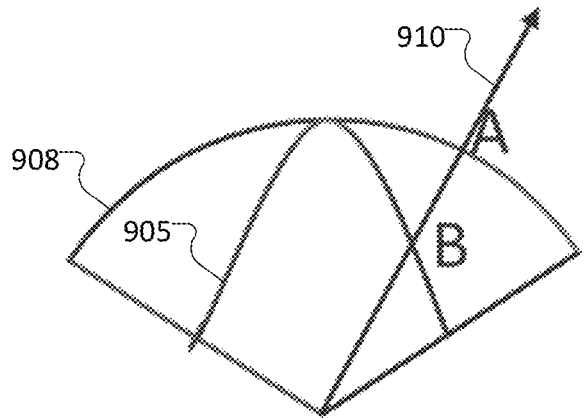
Figure 9A:
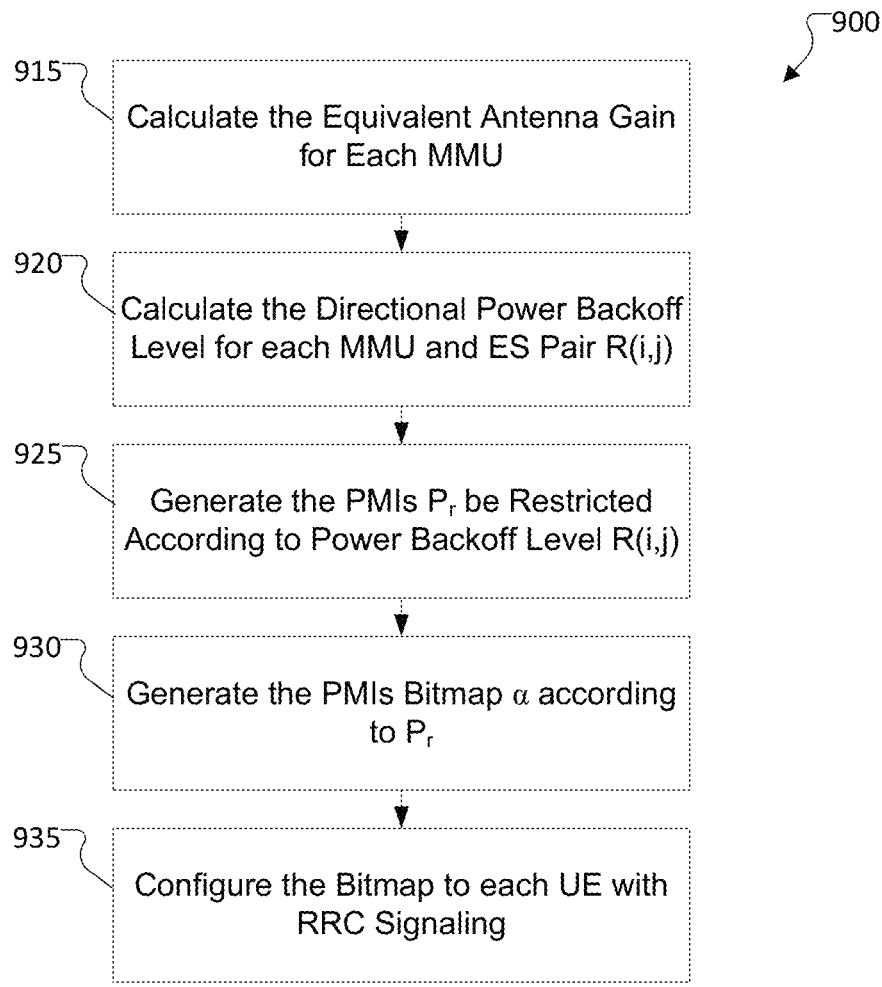

FIG. 9A illustrates another process for two-stage optimization according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 900 depicted in the example depicted is implemented by a processor and transmitter chain in, for example, a base station. Additionally, FIG. 9B illustrates an example beam according to embodiment of the present disclosure.

In the example shown in FIG. 9B, for each PMI, the MMU 705 will generate a respective radiation pattern 905, which can be difficult to calculate. Therefore, an equivalent antenna gain 908 is determined. The equivalent gain 908 will have a uniform gain. The interference is calculated based on the equivalent gain 908. Therefore, each MMU 705 is considered to have an equivalent gain and, if there is interference, a power back-off can be employed and interfering PMIs can be restricted.

In certain embodiments, instead of calculating the gain for each PMI vector with each MMU-ES pair, a unified equivalent antenna gain is used to first calculated the back-off level in each MMU-ES direction, then the back-off level is used to generate the N1-N2 bitmaps. In operation 915, the unified equivalent antenna gain for MMU i is calculated in dB domain as:

$$\hat{G}(\varphi', \theta') = \begin{cases} \max_{s,\varphi,\theta} G(s, \varphi, \theta), -60° \le \varphi' \le 60° \\ 0, \text{ else} \end{cases} \quad (5)$$

In order to meet the regulation, each MMU may select to backoff by R in power, for example, for MMU i, it can backoff in R(i,j) in its direction to ES j. By in linear, the variables are assumed to be automatically converted from dB to linear.

$$P(s, i, j) = P_{tx}(i) - PDL(i, j) + \hat{G}(\varphi', \theta') + R(i, j), \text{ in dB} \quad (6)$$

$$P(s, i, j) = \frac{P_{tx}(i)}{PDL(i, j)} * \hat{G}(\varphi', \theta') * R(i, j), \text{ in linear} \quad (7)$$

In operation 920, the directional power backoff level is calculated according to the optimization is to minimize the total power backoff effect while meeting the regulation according to:

$$\max_{R} \Sigma_{i,j} R(i, j) \quad (8)$$

$$\text{st.,} \begin{cases} \sum_i \frac{P_{tx}(i)}{PDL(i, j)} * R(i, j) * \hat{G}(\varphi', \theta') \le Th_j, \forall j \\ 0 < R(i, j) \le 1 \end{cases} \quad (9)$$

The results of this linear optimization problem are used to calculate how much power each MMU 705 should backoff to each ES 605.

In certain embodiments, the objective function will be a function of R such as:

$$\max_{R} \sum_{i,j} f(R(i, j)). \quad (10)$$

In certain embodiments, directional power backoff level is calculated by:

$$R(i, j) = \min(Th_j * \frac{PDL(i, j)}{P_{tx}(i) * \hat{G}(\varphi', \theta')}, 1). \quad (11)$$

In certain embodiments, directional power backoff level is calculated by:

$$R(i, j) = \min(Th_j * \frac{PDL(i, j)}{P_{tx}(i) * \hat{G}(\varphi', \theta') * \alpha}, 1). \quad (12)$$

Where a is a constant value to accommodate the summation of aggregated interference.

In operation 925, after each MMU 705 knows its directional power backoff level, $\{R(i,j)|j \le J\}$, the respective MMU 705 will generate the restricted PMI set $P_r$. In certain embodiments, for calculating the restricted PMI set, an azimuth and elevation departure angle are calculated based on the geometry locations of MMU 705 and ES 605. Denoting the location of MMU i as $(x_i, y_i, z_i)$, the location of ES j as $(x_j, y_j, z_j)$, the geometry azimuth and elevation angles can be calculated as:

$$\varphi(i, j) = bo(i) - \tan^{-1}\left(\frac{y_i - y_j}{x_i - x_j}\right) \quad (13)$$

$$\theta(i, j) = 90 - \tan^{-1}\frac{z_i - z_j}{\sqrt{(x_i - x_j)^2 + (y_i - y_j)^2}} \quad (14)$$

In Equation 13, bo(i) is the boresight angle of the MMU. The restricted PMIs for MMU i to ES j can be calculated as:

$$P_r(i,j) = \{s | G(s, \varphi(i,j), \theta(i,j)) \geq \hat{G}(i) - R(i,j)\} \quad (15)$$

The total restricted PMIs for MMU i considering all the ES can be calculated as:

$$P_r(i) = U_j P_r(i,j), \quad (16)$$

Among which, and based on the rank of each PMI, the restricted PMIs can be divided for rank 1, rank 2, rank 3, and rank 4 sets denoted as $P_{r1}(i)$, $P_{r2}(i)$, $P_{r3}(i)$, $P_{r4}(i)$. According to 3GPP, each PMI has its own l and m values. The terms $N_1$, $N_2$ are reused as the horizontal and vertical port numbers and $O_1$, $O_2$ as the oversampling factors.

In operation 930, to generate the N1-N2 bitmap a from the restricted PMI is as follows:
Initialize a as an all one vectors with length $N_1 O_1 N_2 O_2$.
For each rank 1 and rank 2 PMIs specified by the generating parameter l and m, directly use $N_2 O_2 l + m$ to map the PMI to bitmaps, i.e., $a_{N_2 O_2 l + m} = 0$.

$$N_2 O_2 (2l+1) + m \quad (17)$$

$$(N_2 O_2 (2l-1) + m) \bmod N_1 O_1 N_2 O_2 \quad (18)$$

$$N_2 O_2 (2l) + m \quad (19)$$

For each rank 3 and rank 4 PMIs, set $a_{(N_2 O_2 (2l-1)+m) \bmod N_1 O_1 N_2 O_2} = 0$, $a_{(N_2 O_2 (2l)+m)} = 0$, and $a_{(N_2 O_2 (2l+1)+m)} = 0$.

Output the bitmap a and configure bitmap a to each UE by RRC signaling in operation 935.

In certain embodiments of operation 930, a method for generating the N1-N2 bitmap a from the restricted PMI is as follows:
Initialize a as an all one vectors with length $N_1 O_1 N_2 O_2$.
For each rank 1 and rank 2 PMIs specified by the generating parameter l and m, directly use $N_2 O_2 l + m$ to map the PMI to bitmaps, ie., $a_{N_2 O_2 l + m} = 0$.
For each rank 3 and rank 4 PMIs, set $a_{(N_2 O_2 (2l-1)+m) \bmod N_1 O_1 N_2 O_2} = 0$.
Output the bitmap a and configure bitmap a to each UE by RRC signaling in operation 935.

In certain embodiments of operation 930, a method for generating the N1-N2 bitmap a from the restricted PMI is as follows:
Initialize a as an all one vectors with length $N_1 O_1 N_2 O_2$.
For each rank 1 and rank 2 PMIs specified by the generating parameter l and m, directly use $N_2 O_2 l + m$ to map the PMI to bitmaps, i.e., $a_{N_2 O_2 l + m} = 0$.
For each rank 3 and rank 4 PMIs, set $a_{(N_2 O_2 (2l)+m)} = 0$, and $a_{(N_2 O_2 (2l)+m)} = 0$.
Output the bitmap a and configured to each UE by RRC signaling in operation 935.

In certain embodiments of operation 930, a method for generating the N1-N2 bitmap a from the restricted PMI is as follows:
Initialize a as an all one vectors with length $N_1 O_1 N_2 O_2$.
For each rank 1 and rank 2 PMIs specified by the generating parameter l and m, directly use $N_2 O_2 l + m$ to map the PMI to bitmaps, ie., $a_{N_2 O_2 l + m} = 0$.
For each rank 3 and rank 4 PMIs, set $a_{(N_2 O_2 (2l-1)+m) \bmod N_1 O_1 N_2 O_2} = 0$ or $a_{(N_2 O_2 (2l)+m)} = 0$, or $a_{(N_2 O_2 (2l+1)+m)} = 0$, or any combinations of these three equations $\{a_{(N_2 O_2 (2l-1)+m) \bmod N_1 O_1 N_2 O_2} = 0$ or $a_{(N_2 O_2 (2l)+m)} = 0$, or $a_{(N_2 O_2 (2l+1)+m)} = 0\}$.
Output the bitmap a and configure bitmap a to each UE by RRC signaling in operation 935.

In certain embodiments of operation 930, a method for generating the N1-N2 bitmap a from the restricted PMI is as follows:
Step 0: Initialize a as an all one vectors with length $N_1 O_1 N_2 O_2$, given a set of PMI to be restricted $P_{r1}(i)$, $P_{r2}(i)$, $P_{r3}(i)$, $P_{r4}(i)$.
Step 1: For each rank 1 and rank 2 PMIs specified by the generating parameter l and m, directly use $N_2 O_2 l + m$ to map the PMI to bitmaps, i.e., $a_{N_2 O_2 l + m} = 0$. Note this as bitmap A=a.
Step 2: Use bitmap A construct rank 3 and rank 4 PMIs, $Q_{r3}(i)$ and $Q_{r4}(i)$.
Step 3: Find the Rank 3/4 PMIs which are in $P_{r3}(i)$, $P_{r4}(i)$, but not in $Q_{r3}(i)$, $Q_{r4}(i)$ $O_{r3}(i) = P_{r3}(i) - Q_{r3}(i)$; $O_{r4}(i) = P_{r4}(i) - Q_{r4}(i)$
Step 4: generate bitmap B by turning all 3 bits off in $O_{r3}(i)$ and $O_{r4}(i)$ by using equation $B_{(N_2 O_2 (2l-1)+m) \bmod N_1 O_1 N_2 O_2} = 0$, and $B_{(N_2 O_2 (2l+1)+m)} = 0$, and $B_{(N_2 O_2 (2l+1)+m)} = 0$, where B is initialized with all one vector with length of $N_1 O_1 N_2 O_2$.
Step 5: for each zero value bit $b_i$ in bitmap B:
(a) Change $b_i = 1$ and get B'
(b) Find Rank 3 and 4 PMIs from B', $S_{r3}(i)$, $S_{r4}(i)$
(c) If all PMIs in $O_{r3}(i)$ and $O_{r4}(i)$ are in $S_{r3}(i)$, $S_{r4}(i)$, then set B=B'
Output the bitmap a as the final bitmap of a=A.*B, where * means element wise multiply.

In certain embodiments of operation 930, a method for generating the N1-N2 bitmap a from the restricted PMI is as follows:
Initialize a as an all one vectors with length $N_1 O_1 N_2 O_2$
For each rank 1 and rank 2 PMIs specified by the generating parameter l and m, directly use $N_2 O_2 l + m$ to map the PMI to bitmaps, ie., $a_{N_2 O_2 l + m} = 0$.
For each rank 3 and rank 4 PMIs, each bit is turned to 0 one by one in a, until $P_{r3}(i)$, $P_{r4}(i)$ are covered.
Output the bitmap a and configure bitmap a to each UE by RRC signaling in operation 935.

Figure 10:
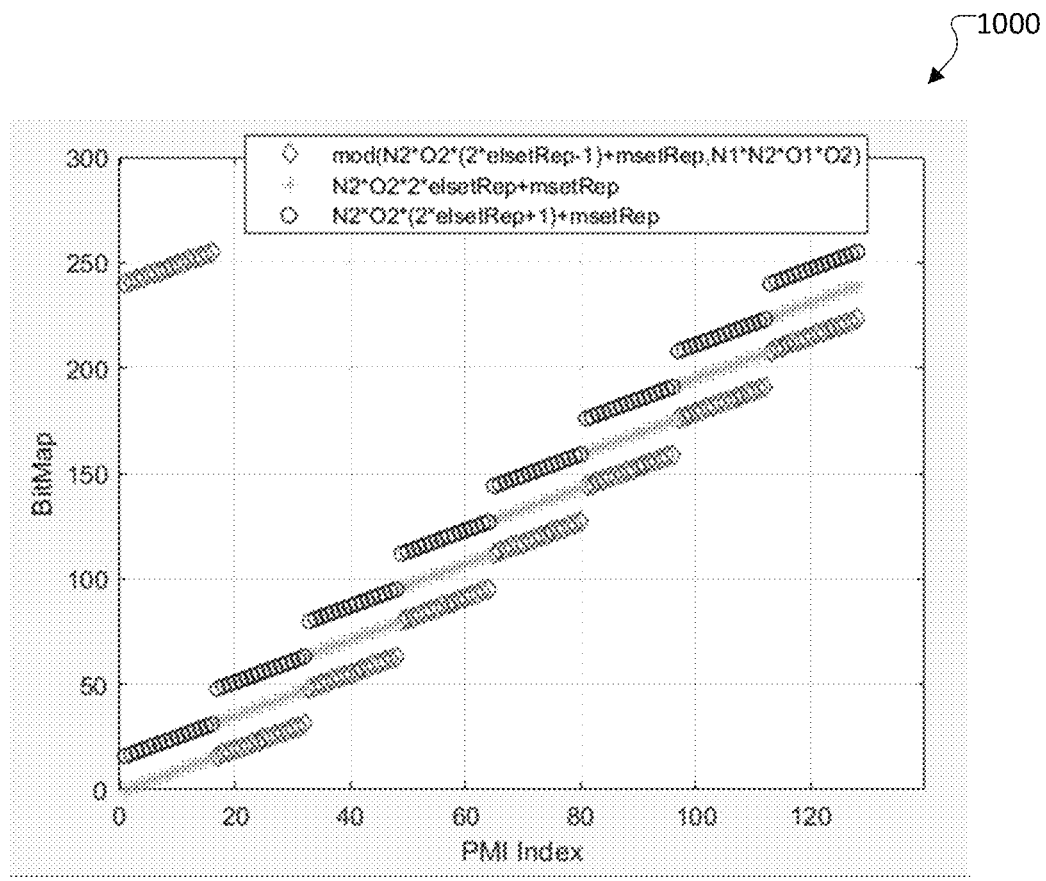
FIG. 10 illustrates an example of bitmap to PMI correlation according to embodiments of the present disclosure.

FIG. 10 illustrates an example of bitmap to PMI correlation according to embodiments of the present disclosure. The embodiment of the correlation 1000 shown in FIG. 10 is for illustration only. Other embodiments could be used without departing from the scope of the present disclosure.

Based on current 3GPP definition, one bit in the bitmap 650 can correspond to multiple PMIs, one PMI will correspond to multiple bits. It is up to implementation to select 1 bit/2 bit/3 bit to turn off for one PMI. That is 3GPP can provide the n1-n2 bitmap 650 signaling to indicate which PMI(s) is restricted. Using the 3GPP definitions, the unrestricted beams 655 and restricted beams 660 can be optimized and indicated by bitmap 650, which is stored and maintained by the gNB 102. For example, bits $a_{(N_2 O_2 (2l-1)+m) \bmod N_1 O_1 N_2 O_2}$, $a_{(N_2 O_2 (2l)+m)}$ and $a_{(N_2 O_2 (2l+1)+m)}$ are each associated with all precoders based on the quantity $\tilde{v}_{l,m} l = 0, \ldots, N_1 O_2 - 1$. If one or more of the associated bits is zero, then PMI reporting is not allowed to correspond to any precoder based on $\tilde{v}_{l,m}$.

For Rank 1 & 2 case, there is one-to-one mapping between bits and PMI
For Rank 3 & 4, number of ports is 16, 24, 32 bits $a_{(N_2 O_2 (2l-1)+m) \bmod N_1 O_1 N_2 O_2}$, $a_{(N_2 O_2 (2l)+m)}$, and $a_{(N_2 O_2 (2l+1)+m)}$ are each associated with all precoders based on the quantity $\tilde{v}_{l,m} l = 0, \ldots, N_1 O_2 - 1$. If one or more of the associated bits is zero, then PMI reporting is not allowed to correspond to any precoder based on $\tilde{v}_{l,m}$. One bit in bitmap could correspond to multiple PMIs. One PMI will correspond to multiple bits (3). It is up to implementation to select 1 bit/2 bit/3 bit to turn off for one PMI. Therefore, one bit can map to multiple PMI because of the different ranks of PMI.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A base station (BS) in a wireless communication system, the BS comprising:
a transceiver; and
a processor configured to regulate a transmit power in a direction of an earth station or a predefined receiver by:
calculating a power flux density for the BS to at least one of the earth station or the predefined receiver;
calculating an equivalent antenna gain for each of a number of base stations;
calculating a directional power back-off level for each of the number of base stations with respect to the earth station or the predefined receiver;
generating a restricted precoding matrix indicator (PMI) based on the calculated directional power back-off level;
generating an N1-N2 bitmap for the BS based on one or more of:
physical parameters of the earth station of the predefined receiver;
physical parameters of the BS;
an operator input metric; or
restricted precoding matrix indicator; and
applying the N1-N2 bitmap for signal transmission to at least one user equipment (UE).

2. The BS of claim 1, wherein the processor is further configured to calculate the direction power back-off level according to:

$$\max_{R} \sum_{i,j} R(i,j)$$

$$\text{st.}, \begin{cases} \sum_{i} \frac{P_{tx}(i)}{PDL(i,j)} * R(i,j) * \hat{G}(\varphi', \theta') \leq Th_j, \forall j \\ 0 < R(i,j) \leq 1 \end{cases}$$

where PDL represent a power density loss from base station i to earth station or receiver j, $\hat{G}(\varphi', \theta')$ represents an equivalent antenna gain of PMIs for the earth station or the predefined receiver at direction $(\varphi', \theta')$, and $P_{tx}$ is transmit power of base station i, $Th_j$ is a protection threshold for earth station or receiver j.

3. The BS of claim 1, wherein the processor is further configured to calculate the restricted PMI whose radiated power at the earth station or the predefined receiver direction is reduced by R according to:

$$P_r(i,j) = \{s | G(s, \varphi(i,j), \theta(i,j)) \geq \hat{G}(i) - R(i,j)\}$$

where $G(s, \varphi(i,j), \theta(i,j))$ is a logarithm scale of sth PMI radiation power at direction of ith base station to jth earth station or predefined receiver direction; $\hat{G}(i)$ is a peak gain of equivalent antenna gain for ith base station.

4. The BS of claim 1, wherein one fixed method among three methods is used to map the restricted PMI to N1-N2 bitmap $$N_2 O_2 (2l+1) + m$$

$$(N_2 O_2 (2l-1) + m) \bmod N_1 O_1 N_2 O_2$$

$$N_2 O_2 (2l) + m$$

where $N_1$, $N_2$, $O_1$ and $O_2$ are a horizontal number of antenna ports, a vertical number of antenna ports, a horizontal oversampled DFT beam, and a vertical oversampled DFT beam, respectively and l and m are PMI parameters following a 3 GPP definition of PMI beams.

5. The BS of claim 4, wherein the N1-N2 bitmap is generated:
obtaining a set of PMI to restrict, P_r1, P_r2, P_r3, P_r4;
generating a bitmap A restriction based on Rank 1 PMI (P_r1) turn off;
using bitmap A to construct rank 3 and rank 4 PMIs, Q_r3 and Q_r4;
determining a Rank 3 and 4 PMIs that are in P_r3/P_r4 but not in Q_r3/Q_r4, O_r3=P_r3−Q_r3; O_r4=P_r4−Q_r4;
generating a bitmap B by turning all 3 bits off in O_r3 and O_r4;
for each zero valued bit $b_i$ in bitmap B:
changing $b_i$=1 and get B';
determining Rank 3 and 4 PMIs from B' as S_r3, S_r4; and
if all PMIs in O_r3 (O_r4) are in S_r3 (S_r4), setting B=B'; and
outputting a final bitmap as A*B.

6. The BS of claim 1, wherein the physical parameters of the earth station or the predefined receiver comprise one or more of:
a location of the earth station or the predefined receiver;
a boresight of the earth station or the predefined receiver; or
a height of the earth station or the predefined receiver, and wherein the physical parameters of the BS comprise:
a location of the BS;
a boresight of the BS;
a height of the BS;
a mechanical down-tilt of the BS; or
an electrical down-tilt of the BS.

7. The BS of claim 1, wherein the earth station or the predefined receiver is configured for non-terrestrial communication.

8. A method comprising:
regulating a transmit power in a direction of an earth station or a predefined receiver by:
calculating a power flux density for a base station (BS) to at least one of the earth station or the predefined receiver;
calculating an equivalent antenna gain for each of a number of base stations;
calculating a directional power back-off level for each of the number of base stations with respect to the earth station or the predefined receiver;

generating a restricted precoding matrix indicator (PMI) based on the calculated directional power back-off level;
generating an N1-N2 bitmap for the BS based on one or more of:
physical parameters of the earth station of the predefined receiver;
physical parameters of the BS;
an operator input metric; or
restricted precoding matrix indicator; and
applying the N1-N2 bitmap for signal transmission to at least one user equipment (UE).

9. The method of claim 8, further comprising calculating the direction power back-off level according to:

$$\max_R \sum_{i,j} R(i, j)$$

$$\text{st.,} \begin{cases} \sum_i \frac{P_{tx}(i)}{PDL(i, j)} * R(i, j) * \hat{G}(\varphi', \theta') \leq Th_j, \forall j \\ 0 < R(i, j) \leq 1 \end{cases}$$

where PDL represent a power density loss from base station i to earth station or receiver j, $\hat{G}(\varphi',\theta')$ represents an equivalent antenna gain of PMIs for the earth station or the predefined receiver at direction ($\varphi'$, $\theta'$), and $P_{tx}$ is transmit power of base station i, $Th_j$ is a protection threshold for earth station or receiver j.

10. The method of claim 8, further comprising calculating the restricted PMI whose radiated power at the earth station or the predefined receiver direction is reduced by R according to:

$$P_r(i,j)=\{s|G(s,\varphi(i,j),\theta(i,j))\geq \hat{G}(i)-R(i,j)\}$$

where G(s, $\varphi(i,j)$, $\theta(i,j)$) is a logarithm scale of sth PMI radiation power at direction of ith base station to jth earth station or predefined receiver direction; $\hat{G}(i)$ is a peak gain of equivalent antenna gain for ith base station.

11. The method of claim 8, wherein one fixed method among three methods is used to map the restricted PMI to N1-N2 bitmap $$N_2O_2(2l+1)+m$$

$$(N_2O_2(2l-1)+m) \mod N_1O_1N_2O_2$$

$$N_2O_2(2l)+m$$

where $N_1$, $N_2$, $O_1$ and $O_2$ are a horizontal number of antenna ports, a vertical number of antenna ports, a horizontal oversampled DFT beam, and a vertical oversampled DFT beam, respectivly and l and m are PMI parameters following a 3GPP definition of PMI beams.

12. The method of claim 11, wherein the N1-N2 bitmap is generated by:
obtaining a set of PMI to restrict, P_r1, P_r2, P_r3, P_r4;
generating a bitmap A restriction based on Rank 1 PMI (P_r1) turn off;
using bitmap A to construct rank 3 and rank 4 PMIs, Q_r3 and Q_r4;
determining a Rank 3 and 4 PMIs that are in P_r3/P_r4 but not in Q_r3/Q_r4, O_r3=P_r3−Q_r3; O_r4=P_r4−Q_r4;
generating a bitmap B by turning all 3 bits off in O_r3 and O_r4;
for each zero valued bit $b_i$ in bitmap B:
changing $b_i$=1 and get B';
determining Rank 3 and 4 PMIs from B' as S_r3, S_r4; and
if all PMIs in O_r3 (O_r4) are in S_r3 (S_r4), setting B=B'; and
outputting a final bitmap as A*B.

13. The method of claim 8, wherein the physical parameters of the earth station or the predefined receiver comprise one or more of:
a location of the earth station or the predefined receiver;
a boresight of the earth station or the predefined receiver; or
a height of the earth station or the predefined receiver, and wherein the physical parameters of the BS comprise:
a location of the BS;
a boresight of the BS;
a height of the BS;
a mechanical down-tilt of the BS; or
an electrical down-tilt of the BS.

14. The method of claim 8, wherein the earth station or the predefined receiver is configured for non-terrestrial communication.

15. A non-transitory computer readable medium comprising instructions that, when executed by a processor of a base station (B S), cause the processor to regulate a transmit power in a direction of an earth station or a predefined receiver by:
calculating a power flux density for the BS to at least one of the earth station or the predefined receiver;
calculating an equivalent antenna gain for each of a number of base stations;
calculating a directional power back-off level for each of the number of base stations with respect to the earth station or the predefined receiver;
generating a restricted precoding matrix indicator (PMI) based on the calculated directional power back-off level;
generating an N1-N2 bitmap for the BS based on one or more of:
physical parameters of the earth station of the predefined receiver;
physical parameters of the BS;
an operator input metric; or
restricted precoding matrix indicator; and
applying the N1-N2 bitmap for signal transmission to at least one user equipment (UE).

16. The non-transitory computer readable medium of claim 15, wherein the instructions are further configured to cause the processor to calculate the direction power back-off level according to:

$$\max_R \sum_{i,j} R(i, j)$$

$$\text{st.,} \begin{cases} \sum_i \frac{P_{tx}(i)}{PDL(i, j)} * R(i, j) * \hat{G}(\varphi', \theta') \leq Th_j, \forall j \\ 0 < R(i, j) \leq 1 \end{cases}$$

where PDL represent a power density loss from base station i to earth station or receiver j, $\hat{G}(\varphi',\theta')$ represents an equivalent antenna gain of PMIs for the earth station or the predefined receiver at direction ($\varphi',\theta'$), and $P_{tx}$ is transmit power of base station i, $Th_j$ is a protection threshold for earth station or receiver j.

17. The non-transitory computer readable medium of claim 16, wherein the instructions are further configured to cause the processor to calculate the restricted PMI whose radiated power at the earth station or the predefined receiver direction is reduced by R according to:

$$P_r(i,j)=\{s|G(s,\varphi(i,j),\theta(i,j))\geq \hat{G}(i)-R(i,j)\}$$

where $G(s, \varphi(i,j), \theta(i,j))$ is a logarithm scale of sth PMI radiation power at a direction of ith base station to jth earth station or predefined receiver direction; $\hat{G}(i)$ is a peak gain of equivalent antenna gain for ith base station.

18. The non-transitory computer readable medium of claim 17, wherein one fixed method among three methods is used to map the restricted PMI to N1-N2 bitmap $$N_2O_2(2l+1)+m \quad (17)$$

$$(N_2O_2(2l-1)+m) \bmod N_1O_1N_2O_2 \quad (18)$$

$$N_2O_2(2l)+m \quad (19)$$

where $N_1$, $N_2$, $O_1$ and $O_2$ are a horizontal number of antenna ports, a vertical number of antenna ports, a horizontal oversampled DFT beam, and a vertical oversampled DFT beam, respectively and l and m are PMI parameters following a 3GPP definition of PMI beams.

19. The non-transitory computer readable medium of claim 18, wherein the instructions are further configured to cause the processor to generate the N1-N2 bitmap by:
  obtaining a set of PMI to restrict, P_r1, P_r2, P_r3, P_r4;
  generating a bitmap A restriction based on Rank 1 PMI (P_r1) turn off;
  using bitmap A to construct rank 3 and rank 4 PMIs, Q_r3 and Q_r4;
  determining a Rank 3 and 4 PMIs that are in P_r3/P_r4 but not in Q_r3/Q_r4, O_r3=P_r3−Q_r3; O_r4=P_r4−Q_r4;
  generating a bitmap B by turning all 3 bits off in O_r3 and O_r4;
  for each zero valued bit $b_i$ in bitmap B:
    changing $b_i$=1 and get B';
    determining Rank 3 and 4 PMIs from B' as S_r3, S_r4; and
    if all PMIs in O_r3 (O_r4) are in S_r3 (S_r4), setting B=B'; and
  outputting a final bitmap as A*B.

20. The non-transitory computer readable medium of claim 15, wherein the physical parameters of the earth station or the predefined receiver comprise one or more of:
  a location of the earth station or the predefined receiver;
  a boresight of the earth station or the predefined receiver; or
  a height of the earth station or the predefined receiver, and wherein the physical parameters of the BS comprise:
  a location of the BS;
  a boresight of the BS;
  a height of the BS;
  a mechanical down-tilt of the BS; or
  an electrical down-tilt of the BS.

* * * * *